United States Patent Office 3,451,018
Patented June 17, 1969

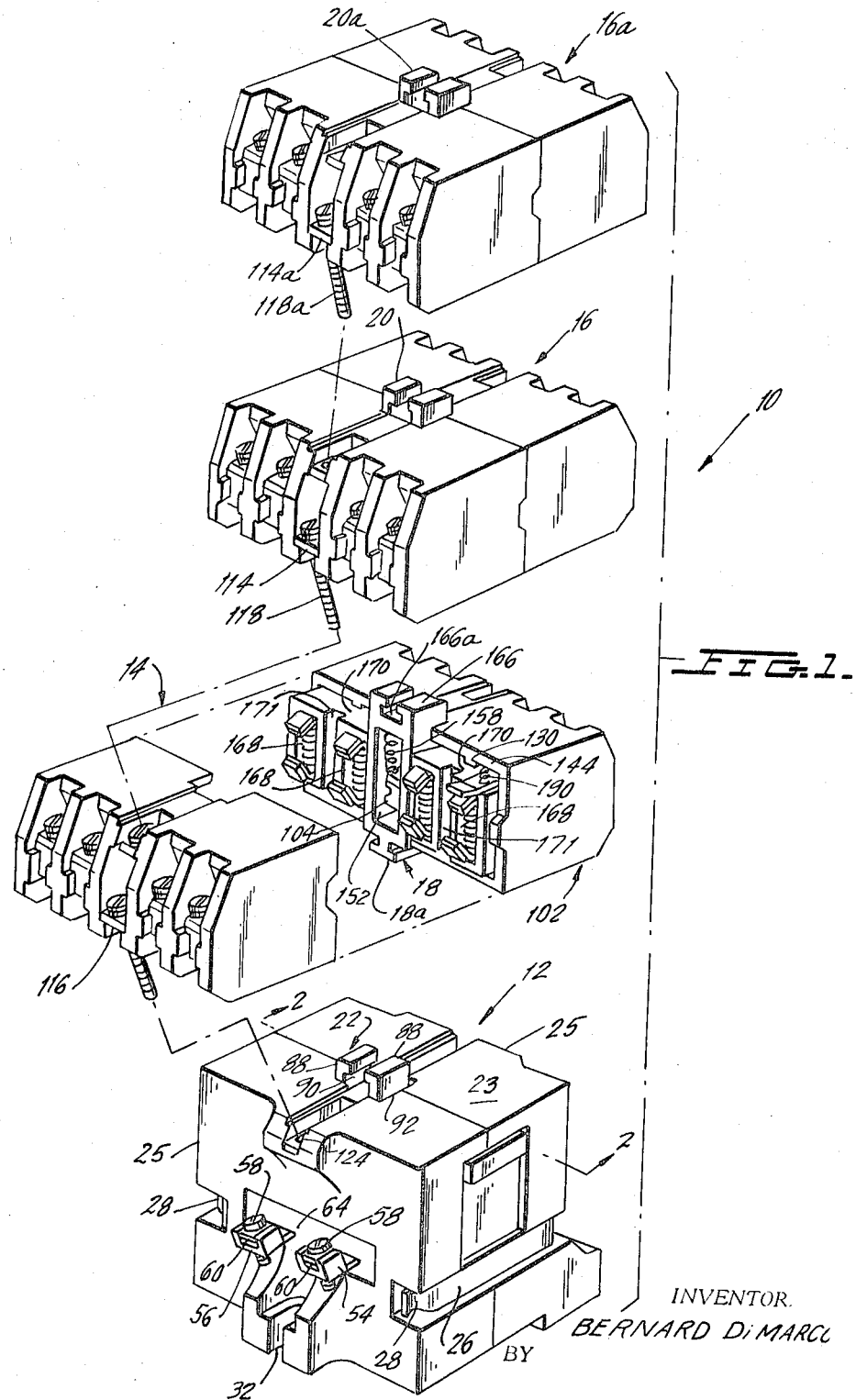

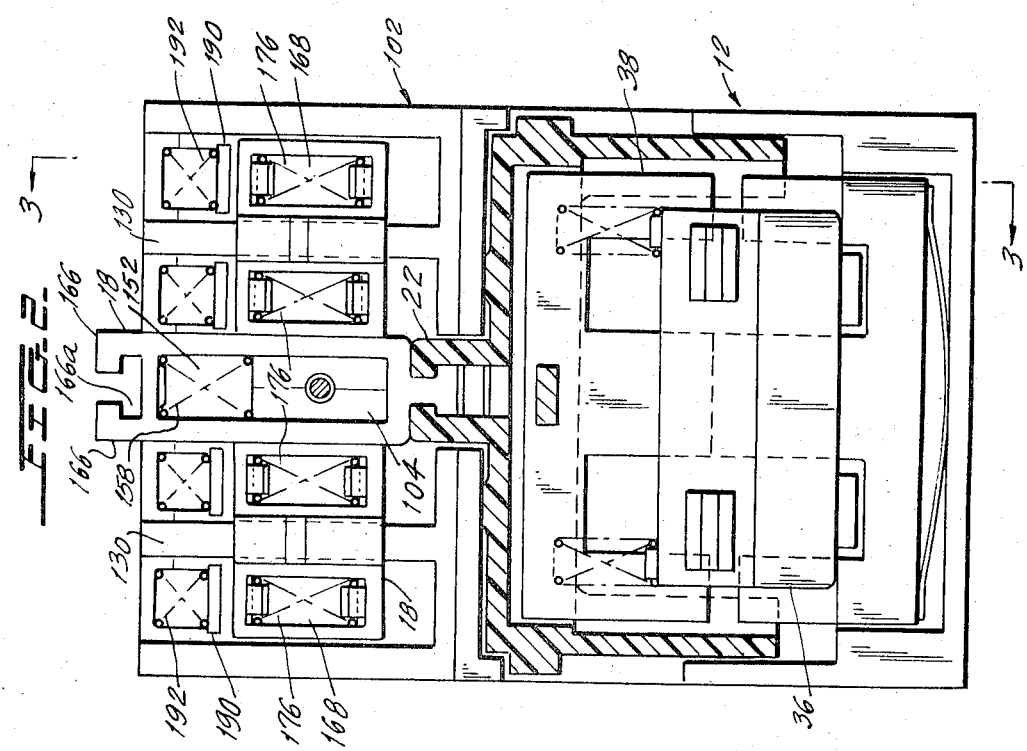
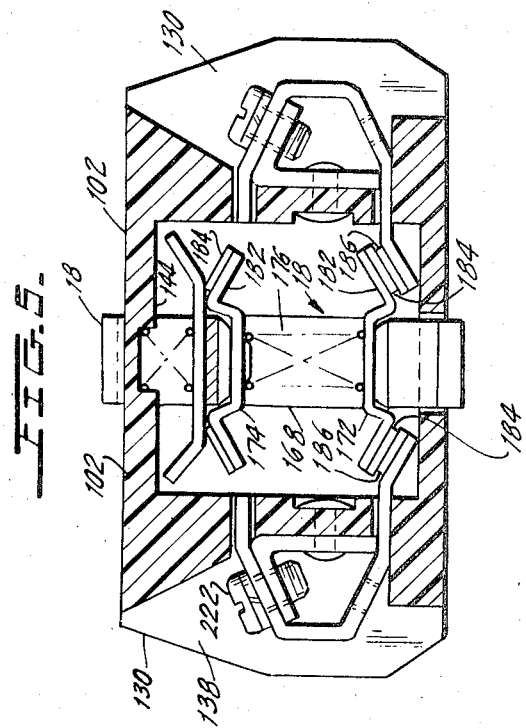

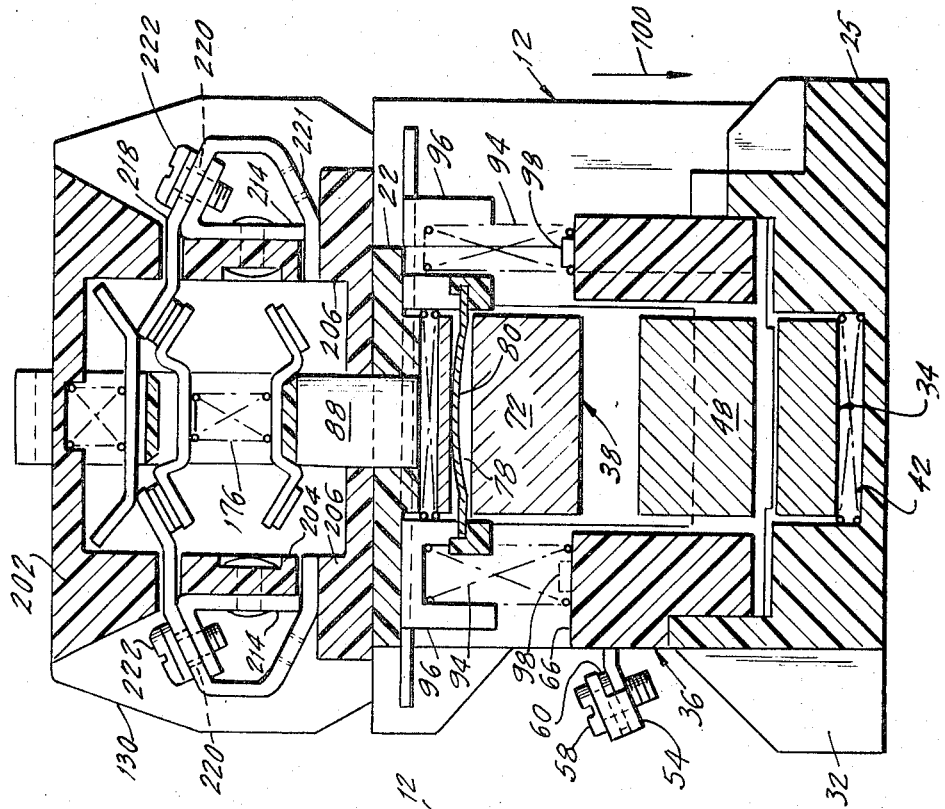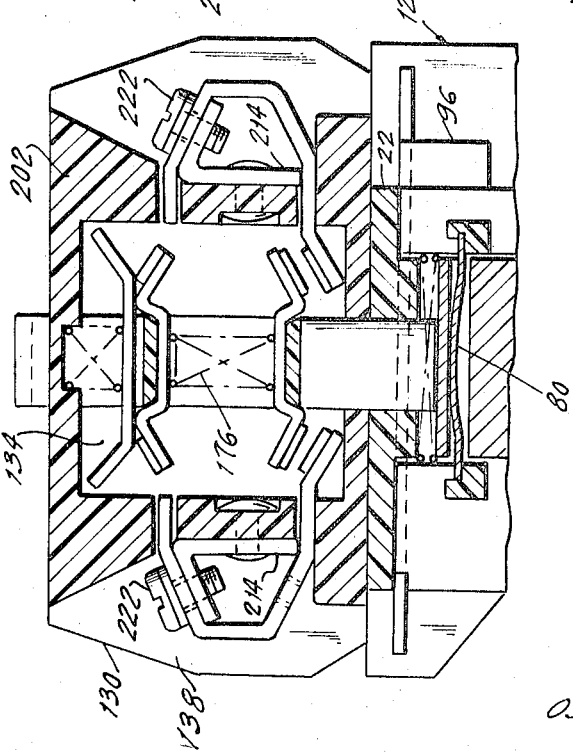

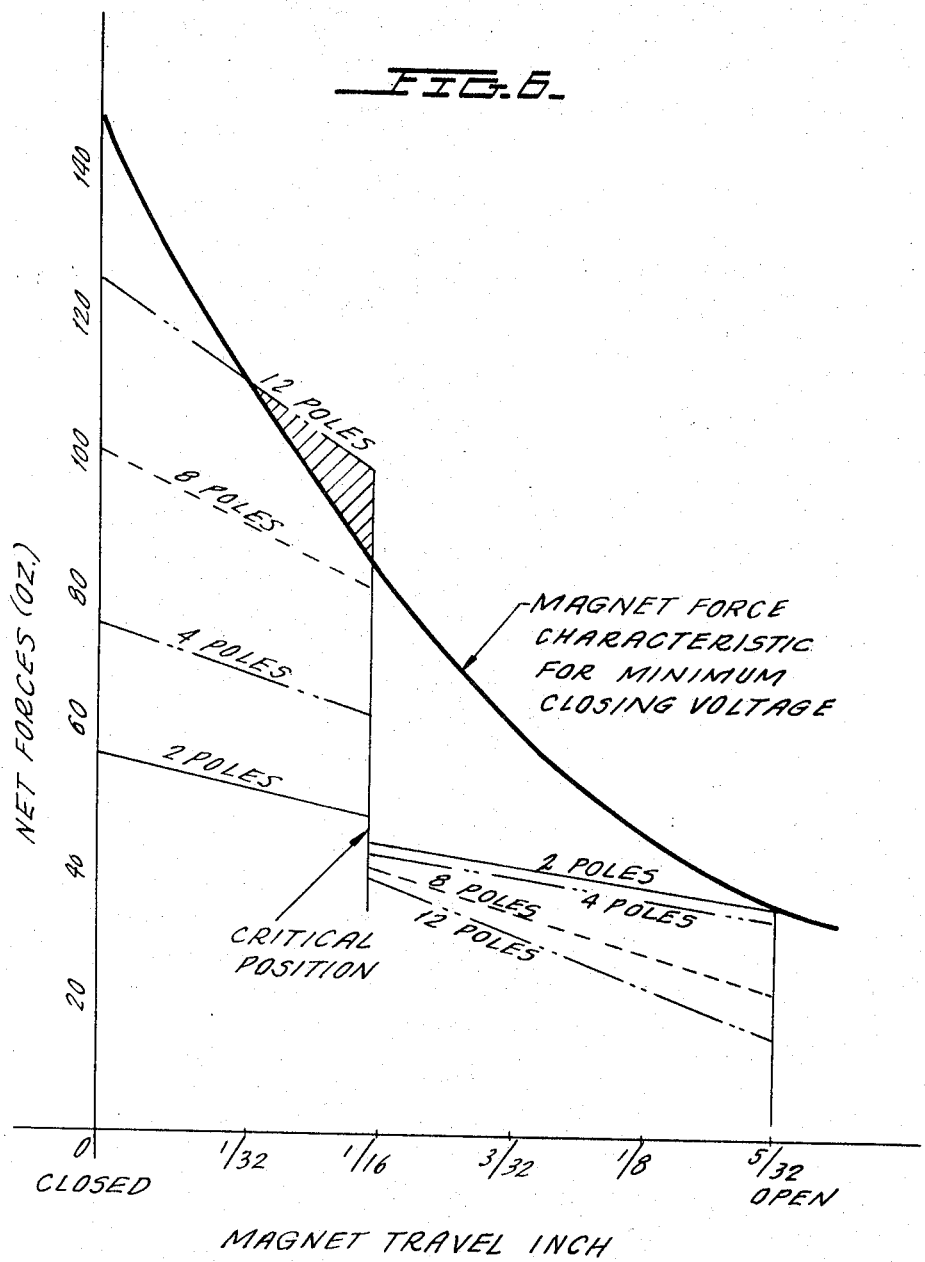

3,451,018
CONTACTOR ELECTROMAGNET
Bernard Di Marco, Lincoln Park, Mich., assignor, by mesne assignments, to I-T-E Imperial Corporation, Philadelphia, Pa., a corporation of Delaware
Filed Nov. 24, 1967, Ser. No. 685,394
Int. Cl. H01h 67/02, 1/48, 1/50
U.S. Cl. 335—131                    8 Claims

ABSTRACT OF THE DISCLOSURE

An electromagnetic contactor is provided with a plurality of poles constructed so that for the fully open magnet position as the number of poles is increased the net force acting in opposition to closing of the magnet decreases. Recognizing this feature, the electromagnet characteristic is made such that for the condition where a maximum number of pole units is to be operated, the force generated by magnetic flux at minimum closing voltage is less than the force required to overcome the spring forces opposing magnet closing during the portion of the closing stroke from the critical position, where the contact pressure springs come into play, to a point between the critical position and the fully closed position of the magnet. The difference between the opposing force and the force attributable to magnetic flux in the region between the critical position and the aforesaid point is overcome by the kinetic energy developed as the magnet moves from its fully open position to the critical position.

---

This application relates to electromagnetic contactors in general and more particularly relates to a contactor in which the net force opposing closing decreases in the fully open position of the magnet as the number of poles increases and in the fully closed position of the magnet the net force opposing closing increases as the number of poles increases. In addition, the force generated by magnetic flux for certain positions of the magnet armature is less than the net spring force opposing closing, with the difference between these forces being provided by kinetic energy developed by the armature in moving from its fully open position.

Copending application Ser. No. 568,249 filed July 27, 1966 entitled Industrial Control Relay with B. Di Marco et al. as inventors and assigned to the assignee of the instant invention discloses an electromagnetic contactor of so-called modular construction in that contact units may be readily added to and removed from a power unit consisting of an electromagnet biased to open position. Prior art approaches to constructions of this type have often consisted of a power unit of basic mechanical construction with changes being made in the magnet coil and/or magnet frame as the number of sets of contacts was changed. In a particular prior art construction where is was desired to utilize the same magnet and coil regardless of the number of sets of contacts being operated, one approach was to utilize a magnet which in providing sufficient flux force for operation of a maximum selected number of sets of contacts provided excessive forces when the minimum selected number of sets of contacts were operated. Another prior art approach utilizing a single magnet frame and coil to operate over a wide range of sets of contacts, was to provide very strong return springs for the electromagnet and to provide very weak contact springs so that the total contact spring force was insignificant compared to the return spring force. In this latter prior art construction it was necessary to use an excessively large magnet to generate a force to overcome the very strong return spring.

The instant invention utilizes sets of contacts having spring means associated therewith which for the fully open position of the magnet exert a net force which opposes the magnet return spring. Thus, as the number of sets of contacts is increased, the force acting in opposition to closing of the magnet, when the latter is in its fully open position, is reduced. During the closing stroke of the magnet, the forces acting in opposition to the magnet increase gradually until a so-called critical position wherein the contact pressure springs come into play. At this critical position there is an abrupt increase in force opposing the electromagnet followed by a gradual increase in opposing force until the magnet is in fully closed position.

In accordance with the instant invention, the magnet characteristic is such that in the fully open position of the magnet, forces attributable to magnetic flux at minimum closing voltage are sufficient to overcome the net opposing force acting on the magnet when it is to operate a minimum number of sets of contacts (poles). At the critical position the force attributable to magnetic flux at minimum closing voltage is below the opposing force encountered when a maximum number of poles are being operated. The force attributable to magnetic flux remains below the opposing force for a maximum number of poles until the magnet is at a point in the closing stroke between the critical position and the fully closed position, after which the force attributable to magnetic flux is in excess of the opposing force.

The flux core required to start operation of a maximum number of poles at minimum voltage in the fully open position of the magnet is sufficiently in excess of the developed as the magnet operates from the open position to the critical position when the maximum number of poles are being operated. This kinetic energy is utilized to carry the magnet between the critical position and the point where the flux generated force again exceeds the opposing force.

By utilizing a magnet having the characteristic above described, poles may be added and/or subtracted from the contactor without changing the electromagnetic power unit or any components thereof because the minimum closing voltage remains constant. At the same time, the construction of the electromagnetic power unit is not excessively large since it is not necessary to utilize the descriptions of the prior art, such as very large return springs and unduly excessive forces for operating lesser numbers of poles.

Accordingly, a primary object of the instant invention is to provide a novel particularly compact construction for an electromagnetic contactor.

Another object is to provide an electromagnetic contactor of this type which utilizes the same electromagnet for operating any selected number of sets of contacts or poles over a relatively large range of numbers.

Still another object is to provide an electromagnetic contactor in which the characteristic of the electromagnet is such that kinetic energy developed by the magnet in moving from the open to the critical position is necessarily utilized to overcome opposing forces present between the critical position and a point between the critical and full closed positions.

These as well as other objects of this invention shall become readily apparent after reading the following description of the accompanying drawings in which:

FIGURE 1 is an exploded perspective of an electromagnetic contactor constructed in accordance with the teachings of the instant invention.

FIGURE 2 is a cross-section taken through line 2—2 of FIGURE 1 looking in the direction of arrows 2—2.

FIGURES 3 and 4 are cross-sections taken tthrough line 3—3 of FIGURE 2 looking in the direction of arrows 3—3 and showing a single contact unit mounted to a power unit. In FIGURE 3, the stationary contacts are set for normally closed operation while in FIGURE 4 the contacts are set for normally open operation.

FIGURE 5 is a cross-section taken through line 3—3 of FIGURE 2 looking in the direction of arrows 3—3 showing a single contact unit when dismounted from the power unit with the stationary contacts set for normally open operation.

FIGURE 6 is a graph illustrating the operating characteristic for the electromagnet of the power unit.

Now referring to the figures. For detailed descriptions of the mechanical elements constituting electromagnetic contactor 10 of FIGURE 1, reference is made to the foresaid copending application Ser. No. 568,249. Briefly, contactor 10 consists of operating block or magnet block assembly 12 and contact block assemblies 14, 16, 16a, with all of the contact blocks 14, 16, 16a being identical except for the selected positioning of their respecttive stationary contacts.

Contact blocks 14, 16, 16a include contact carriers 18, 20 and 20a, respectively. The lower end of carrier 20a interlocks with the upper end of carrier 20 while the lower end of carrier 20 interlocks with the upper end of carrier 18. The lower end of carrier 18 interlocks with the upper end of armature carrier 22 which protrudes above the upper surface 23 of magnet block 12. As will hereinafter become obvious energization of a magnet within magnet block 12 causes armature carrier 22 to move downward, or retract, thereby similarly moving or actuating contact carriers 18, 20 and 20a of contact blocks 14, 16 and 16a to control the opening and closing of the sets of contacts therein.

Magnet block 12 includes two housing halves 25 of suitable insulating material which are normally held in a butting relationship by a pair of spring clips 26 having inturned ends 28 which grasp complementary projections on the respective housing halves 25. U-shaped mounting portions 32 extending outwardly from opposite sides of housing halves 25 at the bottoms thereof provide means for securing magnet block 12 to a supporting surface.

When housing halves 25 are held together by clips 26 an interior cavity is formed with suitable internal formations to position and retain an eletcromagnet consisting of coil assembly 36 and a magnetic frame comprising stationary yoke or core 34 and movable armature 38 secured to carrier 22. Disposed on the interior lower wall of the housing cavity is cushioning spring 42 upon which yoke 34 is seated. Coil assembly 36 is an encapsulated unit having projecting terminal straps 54, 56 each having a terminal screw 58 and a clamp 60 mounted thereto. Coil assembly 36 surrounds the center leg 48 of yoke 34 and is positioned with terminal straps 54 and 56 extending outward of the housing through elongated aperture 64 provided in one of the housing halves 25 for convenience of connecting an energizing circuit to coil assembly 36.

Armature 38 is a three-legged unit whose legs face downwardly in alignment with the upwardly facing legs of core 34 and move downward into engagement therewith upon energization of coil assembly 36. Retainer spring 80 extends through aperture 78 in armature 38 and is received by aligned apertures in carrier 22 thereby securing the latter to armature 38 for movement therewith. Cushioning spring 82 is disposed between the upper surface of armature 38 and the under surface of carrier 22 to properly bias and locate the latter.

As best seen in FIGURE 1, carrier 22 includes a pair of oppositely facing L-shaped projections or claws 88, 88 which cooperate to define passage 90 provided to receive and retain the T-shaped lower end 18a of contact carrier 18. Housing halves 25 include mating notches defining aperture 92 through which claws 88 extend above the top 23 of the casing. Armature return springs 94 are disposed between projections 96 of armature carrier 22 and the upper surface 66 of coil assembly 36 being aligned thereon by upstanding buttons 98. When coil assembly 36 is deenergized springs 94 return armature 38 and armature carrier 22 to the upper or open position with claws 88 occupying the position shown in FIGURE 1.

When coil assembly 36 is energized through the application of operating power at terminals 54, 56, armature 38 and armature carrier 22 move in the direction of arrow 100 (FIGURE 3) until the legs of armature 38 engage the legs of yoke 34. Contact carriers 18, 20 and 20a will be similarly actuated to open and/or close the various sets of contacts within contact blocks 14, 16 and 16a. Upon deenergization of coil assembly 36, return springs 94 move armature 38 and carrier 22 upward to their original positions shown in FIGURE 3, and similarly contact carriers 18, 20 and 20a are moved upward and return to their original positions.

Fastening screws 118 pass through apertures in brackets 114 and are received by tapped apertures 124 in the upper surface 23 of magnet block 12 or are received in tapped apertures in contact block brackets 116, as the case may be, to secure contact blocks 14, 16 and 16a in operative position.

Contact block 14 is provided with a plurality of partitions 130 which partially define four cavities 134 wherein the cooperating contacts of each pole are disposed. The exterior of each portion 102, 102 of contact block case 102, 102 includes a plurality of recesses 138 aligned with the respective interior cavities 134, with recesses 138 being provided to house portions of stationary contact members 140. The upper and lower surfaces of contact block 14 are provided with cutouts defining openings through which the ends of contact carrier 18 extends.

As best seen in FIGURE 1 contact carrier 18 is preferably constructed of a single piece of insulating material and includes elongated central aperture 152 through which mating projections 104, only one of which is shown, of case sections 102, 102 extend. Suitable rivet means (not shown) passes through an aperture formed through the cooperation of projections 104 to hold housing sections 102, 102 assembled. Contact block return spring 158 is disposed in cavity 152 in a position above projection 104 so as to bias carrier 18 upward with respect to housing section 102. The upper end of carrier 18 is provided with oppositely facing claw-like projections 166, 166 cooperating to define a recess 166a which receives and retains the lower end of carrier 20.

Disposed on opposite sides of elongated aperture 152 of carrier 18 are a plurality of spaced apart elongated apertures or receptacles 168 joined by recessed rib portions 170. Notches 171 in ribs 170 are received by insulating barriers 130 to guide movement of contact carrier 18 in response to movement of armature carrier 22 and magnet block 12.

Extending through each of the spaced apart receptacles 168 of contact carrier 18 is a pair of bridging contacts 172, 174 which are urged apart against the upper and lower surfaces of the respective receptacles 168 by biasing springs 76. Suitable notches (not shown) in contacts 172 and 174 are provided to guide movement of the latter within the respective receptacles 168. Bridging contacts 172 and 174 include angled end portions 182 carrying terminal pads 184 which cooperate with terminal pads 186 provided on angled portions 188 of stationary contact members 140, in a manner to be further described herein.

Disposed between the upper wall of each receptacle 168 of contact carrier 18 and the undersurface of the upper wall 144 of contact block cases 102 are a plurality of spring retainers 190. Individual biasing springs 192 engage each of the retainers 190 biasing the latter against either terminal pads 184 of upper bridging contact 174 (FIGURE 2) or the upturned portions 188 of stationary contacts 140 (FIGURE 4) for purposes to be hereinafter described. It is noted that for clarity of illustration only one retainer 190 and one biasing spring 192 are shown in FIGURE 1.

It is again noted that the constructions of contact blocks 16 and 16a of FIGURE 1 are identical to the construction of contact block 14 previously described, thereby reducing manufacturing and inventory costs. Furthermore, although the contact blocks have been shown to include four sets of cooperating bridging and stationary contacts, it is to be understood that the principles of construction hereinbefore described are readily adaptable to provide contact blocks having fewer or greater than four sets of cooperating bridging and stationary contacts. When fewer than four sets of cooperating bridging and stationary contacts are called for, a contact block having a four receptacle carrier 18 may be utilized with contact elements occupying only two of the receptacles 168, in which event only two biasing springs 192 will be utilized thereby reducing the net force urging contact carrier 18 downwardly.

In operation, energization of relay coil 36 draws armature 38 and armature carrier 22 toward the core or yoke 34 thereby simultaneously drawing contact carrier 18, as well as all other contact carriers connected thereto and bridging contacts 172, 174 carried thereby, downward in the direction of arrow 100 of FIGURE 3 to open or close the various circuits being controlled. Deenergization of coil 36 allows return spring 194 of magnet block 12 to return armature 38 and armature carrier 22 to their original positions. Such movement is aided by a compressive bias established by return spring 158 within contact block 14.

Returning to FIGURES 3 through 5, there is shown the manner in which the individual circuits being controlled can be simply and quickly converted between normally open and normally closed conditions from the exterior of the contact blocks 14, 16 and 16a without the necessity of removing these contact blocks from their stacked relationship. It is noted that in FIGURES 3 through 5 the interaction of only one circuit controlling contact arrangement within contact block 14 is illustrated in that the remaining three sets of contacts within block 14 operate in the same manner.

Referring specifically to FIGURE 3, it is seen that portions 202, 204 and 206 of casing blocks 102 integrally join the insulating barriers 130 and define openings or slots 208 and 210 to each recess 138 to which various portions of the stationary contacts 140 may pass into operative engagement with the respective bridging contacts 172, 174 of each set of contacts. Fixedly secured to casing portions 204 are angular terminal supports 214 which include, on their angled portions, threaded apertures 216. Stationary contacts 140 are generally U-shaped and include outwardly angled portions 188 carrying terminal pads 186. Angular portions 218 of the U-shaped portion of stationary contacts 140 include apertures 220 and 221, one of which is aligned with the threaded aperture 216 provided in terminal supports 214 depending on whether the angular portions 188 of the stationary contacts 140 enter the interior of the contact block 14 through slots 208 or 210. Wire gripping screws 222 pass through apertures 220 (or apertures 221) of stationary contacts 140 into apertures 216 of terminal supports 214 to rigidly secure stationary contacts 140 in place while at the same time provide means by which wires from the circuit being controlled may be mechanically and electrically secured to stationary contacts 140.

With angled portions 188 of stationary contacts 140 inserted through slots 208 in the manner shown in FIGURE 3, and with relay coil 36 of magnet block 12 deenergized (as indicated by the space between center leg 72 of armature 38 and center leg 48 of core or yoke 34), terminal pads 184 on the angled portions 182 of upper bridging contact 174 engage terminal pads 186 provided on the angular portions 188 of stationary contacts 140 thereby forming a normally closed circuit therethrough. Energization of relay coil 36 draws armature 38, armature carrier 22 and contact carrier 18 downward to disengage bridging contact 174 from stationary contacts 140 thereby opening the circuit. Upon deenergization of coil 36, return springs 94 and 158 of magnet block 12 and contact block 14, respectively, return contact carrier 18 to the position shown in FIGURE 3 wherein bridging contact 174 engages stationary contacts 140, 140 thereby closing the circuit.

Referring to FIGURE 4 which shows contacts 140, 140 reversed to provide a normally open circuit. In this case angular portions 188 of stationary contacts 140 enter the interior of contact block 14 through lower slots 210. Positioning of slots 210 is such that with relay coil 36 deenergized, terminal pads 184 on the angular portions 182 of lower bridging contact 172 are above and spaced from terminal pads 186 on the angular portions 188 of stationary contacts 140. Thus, the set of contacts as shown in FIGURE 4 functions as a normally open circuit which is closed only in response to energization of relay coil 36.

For a reason to be hereinafter explained in detail, when contact block 14 is dismounted from operating block 12 the net force provided by springs 158, 176 and 192 move contact carrier 18 downward below the position occupied by contact carrier 18 when contack block 14 is mounted to operating block 12. This condition is shown in FIGURE 5 in which, even though stationary contacts 140 are set for normally open circuit operation, when contact block 14 is dismounted lower bridging contact 172 is driven into engagement with stationary contacts 140, 140. It is only when contact block 14 is mounted to operating block 12 that the force of return springs 94 is effective to raise contact carrier 18 and separate bridging contactor 172 from stationary contacts 140 to form the desired normally open circuit seen in FIGURE 4. Because of this, when magnet 34, 36, 38 is in its fully open position (FIGURE 4) the force acting to hold the magnet open is reduced as the number of sets of cooperating contacts is increased.

This is shown graphically in FIGURE 6 where the generally horizontal lines cross the right-hand most vertical line. These lines show the opposing forces acting to oppose closing of magnet 34, 36, 38 for various positions of armature 38 and for operation of different numbers of poles. Considering a two pole structure with normally open contacts, the opposing force acting on armature 38 during the closing stroke increases gradually until a so-called critical position (middle vertical line) at which the contacts initially engage. At this critical position there is an abrupt increase in the opposing force because of loading of the contact pressure springs with such force increasing gradually thereafter until the magnet is closed (armature 38 engages yoke 34).

For the case of a twelve pole unit the opposing forces in fully open position of the magnet are approximately half of the opposing forces for the case of a two pole unit. However, at the critical position the opposing forces for a twelve pole unit jump to approximately twice the opposing forces for a two pole unit and in the fully closed position for the magnet the opposing force for the twelve pole unit is slightly greater than twice the opposing force for the two pole unit.

Magnet 34, 36, 38 is constructed so that when coil 36 is energized with a minimum closing voltage, magnetic flux generated thereby develops closing forces shown in the solid curved line of FIGURE 6. Even though at the critical position, this curved line is below the opposing force for a twelve pole unit and remains therebelow until armature 38 reaches a point approximately midway between the critical and ffully closed position, magnet 34, 36, 38 is still capable of closing all twelve poles. The shaded area above the curve of FIGURE 6 represents the energy difference between the opposing force and the closing force of magnet 34, 36, 38 attributable solely to magnetic flux. It appears that the additional required energy represented by the shaded area in FIGURE 6 is overcome by the kinetic energy developed as armature 38 operates from its fully open to its critical position in that in the fully open position the closing force attributable solely to magnetic flux is approximately twice the opposing force and remains considerably in excess of the opposing force until the critical position is reached.

By taking advantage of the kinetic energy developed by the magnet as the armature moves between the open and critical positions, and combining this with the fact that the opposing force between the open and critical positions becomes less as the number of poles increases, the force characteristic of electromagnet 34, 36, 38 permits the utilization of a relatively small magnet to obtain satisfactory operation for a selected number of poles over a relatively wide range of poles with no appreciable change in minimum closing voltage (minimum excitation), in the case illustrated, the range being from two poles to twelve poles.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which as exclusive privilege or property is claimed are defined as follows:

1. A contactor including contact means having any selected number of poles between a lesser and greater number of poles with the lesser number being no less than two and the greater number being no more than twelve, and an electromagnet for operating said contact means from a nromal to an actuated position; said electromagnet comprising a magnetic frame including a yoke and an armature mounted for movement between a first to a second position, a return spring biasing said armature away from said yoke to said first position, coil means mounted in magnetic coupling relationship to said frame whereby upon energization of said coil means current flow therein generates magnetic flux in said frame attracting said armature toward said yoke and moving said armature to said first position; said armature when moving from said first to said second position while connected to operate said contact means from its normal to its actuated position encountering an opposing force that is a minimum when said armature is in said first position, increases gradually until a critical position where there is an abrupt increase in said opposing force, and thereafter said opposing force increases gradually until said armature reaches said second position; said poles including additional spring means positioned and loaded to exert a net force opposing said return spring when said armature is in said first position and to exert a net force aiding said return spring when said armature is in said second position; said contact means also constructed and connected so that while said armature is between said first and critical positions said opposing force decreases as said selected number of poles increases and while said armature is between said critical and second positions said opposing force increases as said selected number of poles increases.

2. A contactor as set forth in claim 1 in which the electromagnet has a characteristic with minimum rated excitation such that when operating said greater number of poles to actuated position force attributable to magnetic flux in said frame is less than the opposing force acting when said armature is between said critical position and a point intermediate said critical and said second positions; said characteristic also being such that for all other positions of said armature between said first and said second positions force attributable to magnetic flux in said frame is greater than the opposing force; said characteristic further being such that when said armature is moving from said critical position to said point momentum developed in moving said armature from said first to said critical position is sufficient to provide energy to overcome the difference between the opposing force and force attributable to magnetic flux; said characteristic still further being such that with said lesser number of poles and said armature in said first position force attributable to magnetic flux in said frame exceeds the opposing force.

3. An electromagnet as set forth in claim 2 in which said greater number is at least twice said lesser number.

4. An electromagnet as set forth in claim 2 in which said greater number is at least three times said lesser number.

5. An electromagnet as set forth in claim 2 in which said greater number is 12 and said lesser number is 2.

6. An electromagnet as set forth in claim 1 in which said greater number is at least twice said lesser number.

7. An electromagnet as set forth in claim 1 in which said greater number is at least three times said lesser number.

8. An electromagnet as set forth in claim 1 in which said greater number is 12 and said lesser number is 2.

References Cited

UNITED STATES PATENTS

| | | | |
|---|---|---|---|
| 3,099,728 | 7/1963 | Scheib | 335—198 |
| 3,238,329 | 3/1966 | Russo | 335—132 |
| 3,249,716 | 5/1966 | Haydu | 335—198 |

BERNARD A. GILHEANY, *Primary Examiner.*

H. BROOME, *Assistant Examiner.*

U.S. Cl. X.R.

335—197